B. DARRACH, Jr.
APPARATUS FOR MAKING LAMINATED SHEET METAL STOCK.
APPLICATION FILED OCT. 27, 1915.
1,199,530.
Patented Sept. 26, 1916.
3 SHEETS—SHEET 1.
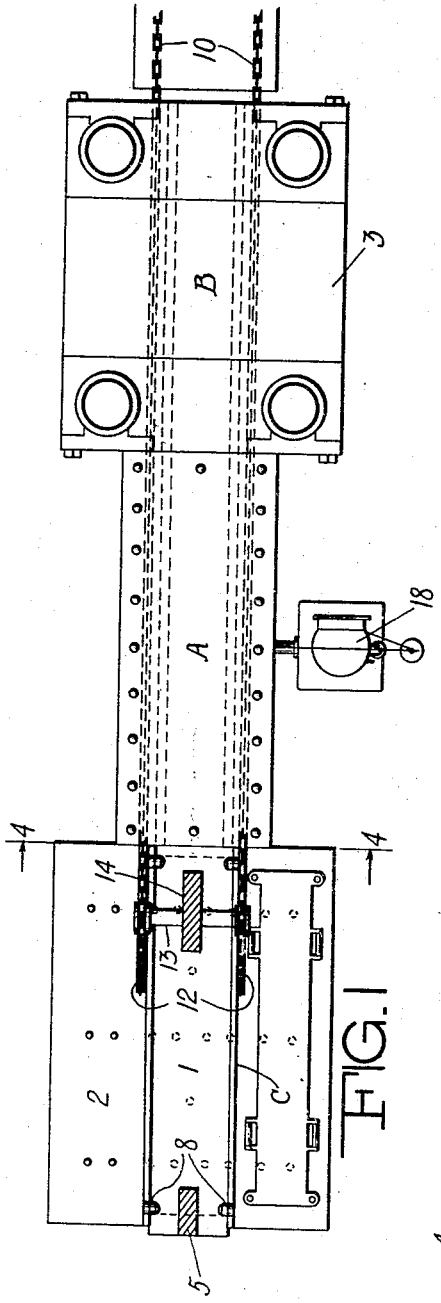
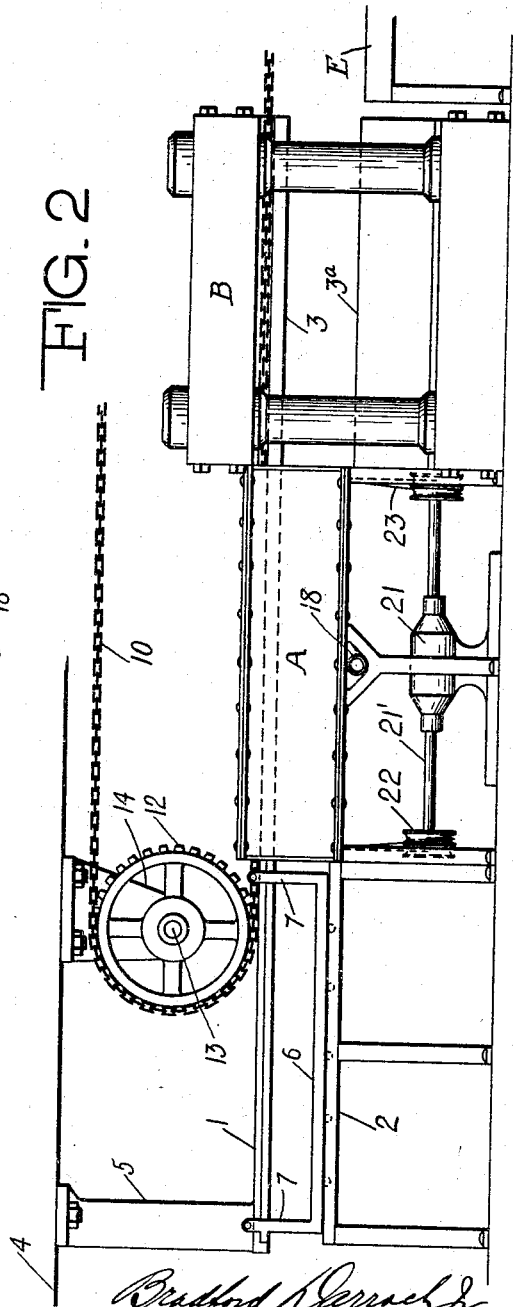

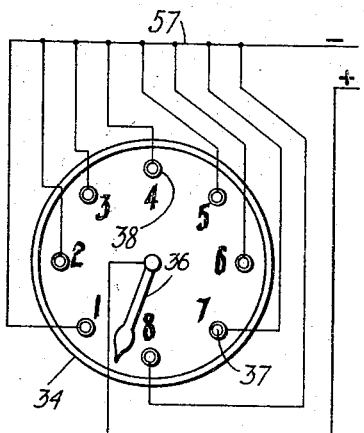

B. DARRACH, Jr.
APPARATUS FOR MAKING LAMINATED SHEET METAL STOCK.
APPLICATION FILED OCT. 27, 1915.
1,199,530.
Patented Sept. 26, 1916.
3 SHEETS—SHEET 3.
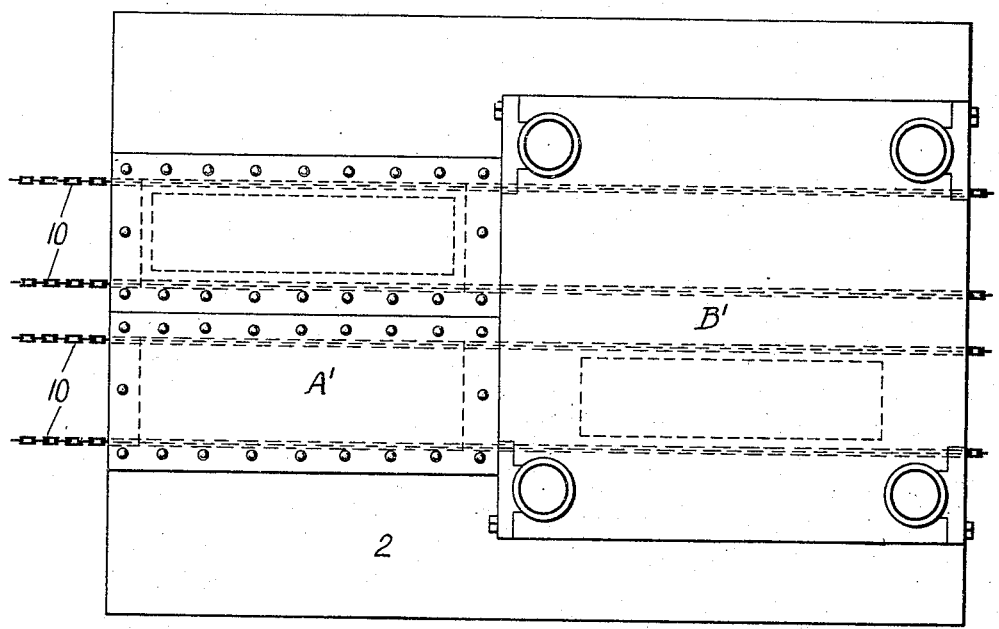
FIG. 9
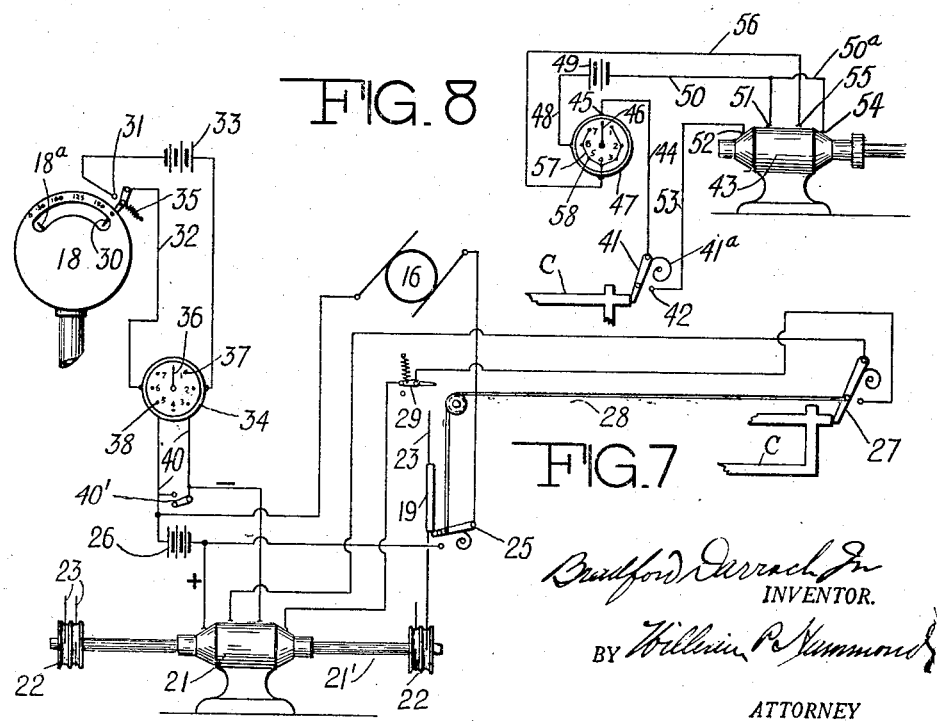
FIG. 8
FIG. 7
Bradford Darrach Jr.
INVENTOR.
BY William P. Hammond
ATTORNEY

UNITED STATES PATENT OFFICE.

BRADFORD DARRACH, JR., OF ELIZABETH, NEW JERSEY, ASSIGNOR TO LAMINATED SHIM COMPANY, OF NEW YORK, N. Y., A CORPORATION OF NEW YORK.

APPARATUS FOR MAKING LAMINATED SHEET-METAL STOCK.

1,199,530.   Specification of Letters Patent.   Patented Sept. 26, 1916.

Application filed October 27, 1915. Serial No. 58,119.

*To all whom it may concern:*

Be it known that I, BRADFORD DARRACH, Jr., a citizen of the United States, residing at Elizabeth, in the county of Union and State of New Jersey, have invented certain new and useful Improvements in Apparatus for Making Laminated Sheet-Metal Stock, of which the following is a specification.

The present invention relates to an apparatus for making the laminated sheet metal stock from which shims, washers and analogous spacing devices are adapted to be cut or stamped by suitable dies or otherwise, the device being an improvement in the art over the apparatus shown in the Lindhe Patent, No. 1,096,512.

Among the objects of the invention are to provide an apparatus of this character which will produce a very uniform stock from which shims and the like may be manufactured, and which is practically automatic in its operation, requiring but a small amount of attention from the operator.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a machine for making laminated sheet metal stock constructed in accordance with the invention, portions being broken away and shown in section. Fig. 2 is a side elevation of the same, the finishing table and one end of the conveyer chain being broken away. Fig. 3 is a side elevation of the finishing table and the portion of the conveyer chain over the same, the adjacent end of the press also showing. Fig. 4 is a transverse sectional view through the machine on the line 4—4 of Fig. 1, the doors of the heating chamber being shown in an open position. Fig. 5 is a detail perspective view of a portion of the track and one end of a carrier, a pile of the thin sheets being shown in position upon the carrier. Fig. 6 is a diagrammatic view of the timing mechanism by means of which the length of time the sheets are treated within the heating chamber is definitely regulated. Fig. 7 is a diagrammatic view of the electric circuits by means of which the passage of the carrier through the heating chamber is automatically controlled. Fig. 8 is a similar view of the circuits for automatically operating the press as the carrier moves through the same. Fig. 9 is a plan view of a heating chamber and press, showing a slight modification in which the heating chamber is of sufficient capacity to receive two carriers, thereby rendering the operation of the device practically continuous, since about twice the length of time is required in the heating chamber that is required in the press.

Corresponding and like parts are referred to in the following description and indicated in all the views of the drawings by the same reference characters.

Specifically describing the present embodiment of the invention, the reference numeral 1 designates an overhead track which passes over a preparing table 2, through a heating chamber or furnace A and through a hydraulic press B, being secured at one end thereof to the lower face of the top 3 of the said press, while the opposite end thereof is shown as supported from the ceiling 4 by a suitable hanger or bracket 5. This track 1 is formed with laterally projecting side flanges 1ª which extend longitudinally of the track for the full length thereof, and the lower face 1ᵇ of the track presents a continuous flat surface. One or more carriers C may be provided to travel upon the track 1 and carry the piles of thin metal sheets through the heating chamber and press. The carrier C is formed with a bottom or supporting plate 6 having upwardly projecting side frames 7 at the longitudinal edges thereof, said side frames being provided at their upper edges with inwardly projecting rollers 8 adapted to travel upon the side flanges 1ª of the track 1. It will be observed that the side flanges 1ª are arranged below the top of the track so as to provide a clearance space above the flanges to accommodate the movements of the rollers 8 when the carriage is moved upwardly within the press to subject the pile D of thin metal sheets to pressure. It will also be observed that the forward end of each of the carriers C is provided at the top thereof with a pair of laterally and upwardly projecting hook members 9 which are adapted to engage the links of the conveyer chains 10.

The material to be treated is thin sheets of metal, previously coated with lead or a suitable solder alloy, said sheets being exceedingly thin, usually two thousandths of an inch or less in thickness. The desired number of solder coated sheets are placed in a pile D and interposed between a pair of thick protecting plates 11. The pile D of thin sheets and the protecting plates 11 are then placed upon the carrier C, which is upon the preparing table 2 at this stage of the operation. The carrier C may now be properly positioned upon the feed end of the track 1 and moved forward to bring the hook members 9 at the forward end thereof into engagement with the conveyer chains 10. There are two of these endless chains 10, said chains passing around suitable sprocket wheels 12 upon shafts 13 which are journaled within suitable bearings provided upon hangers 14 projecting downwardly from the ceiling. One of these shafts 13 is connected in some suitable manner as by means of the belt 15 to a driving motor 16.

The carrier C is mounted to travel into the heating chamber A where the pile D of thin sheets is subjected to a certain predetermined temperature for a definite predetermined time, after which the carrier is automatically advanced into the press B and the pile D of thin sheets, while still in a heated condition, subjected to a certain pressure for a definite predetermined length of time. The temperature and time of heating, as well as the time of pressing is automatically controlled, so that an exceptionally uniform product is obtained, and only a minimum amount of attention is required from the operator. When the carrier emerges from the press B, it leaves the track 1 and is drawn over the finishing table E. Suitable guide rollers 17 cause the conveyer chains 10 to be deflected upwardly at the far end of the finishing table E, and as the chains are thus deflected upwardly they become automatically disengaged from the hook members 9 of the carrier so as to release the carrier and leave it upon the finishing table E. The finished laminated sheet metal stock may then be removed from the carrier and the carrier itself taken back to the preparing table 2 at the opposite end of the machine, where a fresh charge of thin metal sheets may be placed upon the same preparatory to its next passage through the machine.

The heating chamber A may be a gas furnace of the conventional construction, and an automatic temperature regulator 18 is used in connection therewith, said temperature regulator being of any conventional construction and enabling a definite predetermined temperature to be maintained within the heating chamber. The ends of the heating chamber or gas furnace are adapted to be closed by vertically movable doors 19 which travel within guideways 20 and are lowered in order to open the same. A door controlling motor 21 is shown as arranged under the gas furnace A, the shaft 21' of the motor extending longitudinally of the furnace and being extended to the ends thereof. The extremities of the motor shaft are shown as provided with pulleys 22 engaging cables 23 which pass upwardly around guide pulleys 24 and downwardly to the sliding furnace doors 19. When the motor 21 is driven in one direction the cables 23 are unwound from the pulleys 22 and the furnace doors 19 permitted to drop into an open position, although when the motor is reversed and driven in the opposite direction, the cables 23 are wound upon the pulleys or drums 22 so as to close the furnace doors 19.

Electrically controlled mechanism is provided for moving the carrier C into the gas furnace A, retaining it within the gas furnace while the latter is at a certain fixed temperature for a definite predetermined length of time, and then automatically moving the carrier out of the furnace. Each pile or batch of the sheet metal stock is thus heated in exactly the same manner so as to obtain a uniform product, and the machine can be regulated so that the stock will be heated to exactly the proper temperature and for exactly the proper period necessary to soften the solder without burning either it or the sheets themselves. In practice, it has been found that a period of about four minutes is sufficient time to heat the sheet metal stock, where stock of the more usual sizes is employed.

Assuming that the carrier C with a pile D of properly assembled thin metal sheets is in position on the preparing table 2, the operator closes a switch 25 and thereby energizes the door opening motor 21 and the driving motor 16, current being received through suitable conductors from a source of supply 26. Both of the doors 19 of the gas furnace are thus opened and the carrier C moved into the furnace by the conveyer chains 10. When the carrier C is properly positioned within the furnace A, the forward end thereof engages a switch 27 and moves the same so as to reverse the polarity of the door operating motor 14 and close both doors of the gas furnace. This switch 27 is suitably connected, as by means of a cable 28 to the switch 25 so that the latter is opened and the driving motor 16 stopped at the same time that the motor 21 is set in motion to close the furnace doors. A switch 29 is arranged in the path of one of the furnace doors 19 so as to be engaged thereby when it reaches a closed position, said switch serving to break the circuit of the door operating motor 21 and to stop the motor when the doors are completely closed.

The indicating hand or pointer 18$^a$ of the temperature regulating device 18 (see Fig. 7) is adapted to engage a switch lever 30 when the proper temperature has been produced within the furnace. This switch lever 30 is thereby moved into engagement with a contact 31 so as to close a circuit 32 including a source of electrical supply 33 and the timing device or clock mechanism 34. A spring 35 normally holds the switch lever 30 in inoperative position, although as soon as the proper temperature is reached within the furnace, the indicating hand 18$^a$ swings the lever into engagement with the contact point 31 so as to close the circuit. This results in starting the timing device 34 so that the hand or pointer 36 is revolved over the face thereof. This timing device 34 is of the well-known and conventional construction, and the manner of arranging the contact plugs on the face thereof is shown diagrammatically by Fig. 6. Plugs 37 are adapted to be fitted removably into any selected ones of a peripheral row of sockets 38, said sockets being connected by conductors 39 to one of the terminals of a circuit 40, while the pointer 36 is connected to the opposite terminal of the circuit, said circuit including the source of electrical supply 26 and the door operating motor 21. One of the plugs 37 can be inserted within a suitable socket 38 so that after the proper temperature has been maintained within the furnace for the predetermined length of time, the pointer or hand 36 will contact with the plug 37 and thereby close the circuit 40, with the result that the furnace doors 19 are lowered into an open position.

As soon as the doors 19 are completely opened, one of the doors will engage the switch 25 and operate the same to close the circuit of the driving motor 16, thereby causing the carrier C to move from the furnace A into the hydraulic press B. When the carrier is properly positioned within the hydraulic press it will engage a switch 41 and move the same into engagement with a contact point 42, thereby closing the circuit through an electric motor 43 which has an operative connection with the valves of the hydraulic press B so as to set the press in operation and cause the bed 3$^a$ thereof to be forced upwardly toward the top 3. The switch 41 is connected by a wire 44 to a contact 45 which is normally engaged by the swinging pointer 46 of a time controlling mechanism 47, said pointer being connected by a wire 48 to one of the terminals of a suitable source of electric supply 49. A wire 50 connects the opposite terminal of the said source of electric supply to one of the terminals 51 of the motor 43, while the complemental terminal 52 of the motor is connected by a wire 53 to the before mentioned contact point 42. A branch wire 50$^a$ connects the wire 50 to one of the reversing terminals 54 of the motor 43, the opposite reversing terminal 55 being connected by a wire 56 to a series of sockets 57 arranged upon the periphery of the clockwork timing device 47. A plug 58 may be fitted in any selected one of the sockets 57, and when the hand 46 of the timing mechanism moves away from the contact 45 and engages the plug 58, it will be obvious that the current through the motor 43 will be reversed, thereby changing the polarity of the motor and operating the same to close the valves of the hydraulic press and throw the hydraulic press out of operation. The timing device 47 may be of any well-known and conventional construction, being arranged to be automatically set into operation when the switch 41 is closed, and the hand or pointer 46 returning automatically to its original position when the press is thrown out of operation. A spring 41$^a$ normally holds the switch 41 in an open position and causes the switch to automatically open as soon as the carrier is moved away from the same.

The thin sheets of metal are heated within the furnace and the solder reduced to a fluid form within the furnace so that when the pile of sheet metal is subjected to pressure within the hydraulic press, any surplus solder is squeezed out and all air is expelled, with the result that a very uniform product is obtained. The provision of automatic mechanism for definitely regulating the temperature and the exact length of time the stock shall remain within the heating chamber eliminate the necessity for any guess work on the part of the operator, and enable the device to be successfully operated by an unskilled workman and with but little attention. The possibility of accidentally raising the temperature to such an extent to burn the solder and thin metal plates is also eliminated.

A slight modification is shown by Fig. 9, in which the furnace A' is shown as formed with two chambers so that two piles or batches of sheet metal plates can be heated at the same time. The hydraulic press B' is also sufficiently wide to admit of the carrier from either one of the chambers of the furnace A' being moved into the same. Such an arrangement may result in a great saving of time, since the time required for squeezing the sheet metal plates in the hydraulic press is only about half the time required for properly heating them within the furnace. It will thus be obvious that such an arrangement provides for practically a continuous operation of all parts of the machine and enables the press to be utilized continuously whereas it would otherwise be idle for substantially one-half of the time.

Having thus described the invention, what I claim as new and desire to secure by Letters Patent, is:—

1. An apparatus of the character described, including a heating furnace, means for conveying the material to be treated into the heating furnace, and automatically controlled means for maintaining the material in the heating chamber a predetermined length of time under a definite predetermined temperature.

2. An apparatus of the character described, including a heating chamber, pressing means, means for conveying the material to be treated to the heating chamber and pressing means, automatically controlled means for maintaining the material in the heating chamber a predetermined length of time under a definite predetermined temperature, and automatically controlled means for governing the action of the pressing means upon the material.

3. An apparatus of the character described, including a heating chamber, pressing means, a carrier for conveying the stock to be treated to the heating chamber and press, and automatically controlled means for moving the carrier from the heating chamber to the press and timing the action of the heating chamber and press upon the stock placed upon the carrier.

4. An apparatus of the character described, including a heating chamber, a press, a carrier adapted to receive the stock to be treated for conveying it to the heating chamber and press, automatically controlled means for moving the carrier and stopping it consecutively at the proper positions within the heating chamber and press, and means for automatically timing the action of the heating chamber and press upon the stock placed on the carrier.

5. An apparatus of the character described, including a heating chamber, a press, a carrier adapted to receive the stock to be treated and convey it to the furnace and press, automatically controlled means for moving the carrier through the heating chamber and press and consecutively stopping it at the proper position within the heating chamber and press, automatic means for maintaining the carrier within the heating chamber for a predetermined length of time under a definite predetermined temperature, and automatically controlled means for maintaining the carrier in the press for a predetermined length of time.

6. An apparatus of the character described, including a heating chamber, a press, a track extending through the heating chamber and press, a carrier movable upon the track and adapted to receive the stock to be treated, automatically controlled means for moving the carrier through the heating chamber and press and holding it consecutively at proper positions within the heating chamber and press, automatically controlled means for maintaining the carrier in the heating chamber a predetermined length of time under a definite predetermined temperature, and automatically controlled means for retaining the carrier in the press for a predetermined length of time.

7. An apparatus of the character described, including a heating chamber, a press, a track extending through the heating chamber and press, a carrier adapted to receive the stock to be treated and movably mounted upon the track, means for moving the carrier through the heating chamber and press consecutively and stopping the same at proper positions within the heating chamber and press, doors for the heating chamber, a motor controlling the doors, automatically controlled means for operating the motor to close the doors when the carrier is in position within the heating chamber and subsequently opening the doors after the carrier has remained in the heating chamber a predetermined length of time, and means for automatically regulating the action of the press on the carrier.

8. An apparatus of the character described, including a heating chamber, a press, a track extending through the heating chamber and press, a carrier movable upon the track and adapted to receive the stock to be treated, means for moving the carrier along the track and consecutively stopping it at proper positions within the heating chamber and press, doors for the heating chamber, means actuated by the carrier when it reaches a proper position within the heating chamber to close the doors and automatically open the doors after the carrier has remained in the heating chamber a predetermined length of time, and means actuated by the carrier for automatically timing the action of the press thereon.

9. An apparatus of the character described, including a heating chamber, a press, a track extending through the heating chamber and press, a carrier movable upon the track and adapted to receive the stock to be treated, means for moving the carrier along the track and automatically stopping it at proper points within the heating chamber and press, doors for the heating chamber, means actuated by the carrier when it reaches a proper position within the heating chamber for closing the doors, time controlled means for automatically opening the doors at the expiration of a predetermined length of time, a temperature controlling device operatively connected to the timing device to start the operation of the latter when a predetermined temperature has been reached in the heating chamber, and means for controlling the action of the press on the carrier.

10. An apparatus of the character described, including a press, a track extending through the heating chamber and press, a carrier movable upon the track and adapted to receive the stock to be treated, automatically controlled means for retaining the carrier in the heating chamber a definite predetermined length of time, means actuated by the carrier for starting the press in operation when the carrier is in proper position within the press, and time controlled means for automatically stopping the operation of the press at the expiration of a predetermined length of time.

11. An apparatus of the character described, including a heating chamber, a press, a track extending through the heating chamber and press, a carrier movable upon the track and adapted to receive the stock to be treated, doors for the heating chamber, means for automatically closing the doors when the carrier reaches a proper position within the heating chamber, means for automatically opening the doors after the carrier has remained in the heating chamber a predetermined length of time at a definite predetermined pressure, and means actuated by the opening of the doors for moving the carrier out of the heating chamber and into the press.

12. An apparatus of the character described, including a heating chamber, a press, a track extending through the heating chamber and press, a carrier movable upon the track and adapted to receive the stock to be treated, doors for the heating chamber, automatically controlled means for opening the doors after the carrier has remained in the heating chamber a predetermined length of time under a predetermined temperature, and means actuated by the opening of the doors for moving the carrier out of the heating chamber into the press.

BRADFORD DARRACH, Jr.

Witnesses:
 Wm. P. Hammond,
 P. F. Sonnek.

Copies of this patent may be obtained for five cents each, by addressing the "Commissioner of Patents, Washington, D. C."